United States Patent
Lee et al.

(10) Patent No.: US 9,507,516 B2
(45) Date of Patent: Nov. 29, 2016

(54) METHOD FOR PRESENTING DIFFERENT KEYPAD CONFIGURATIONS FOR DATA INPUT AND A PORTABLE DEVICE UTILIZING SAME

(75) Inventors: Joo Hyung Lee, Dobong-gu (KR); Seok Hee Na, Incheon (KR); Ying Dong, Seoul (KR); Jung Hwa Shim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/557,728

(22) Filed: Jul. 25, 2012

(65) Prior Publication Data

US 2013/0063357 A1    Mar. 14, 2013

(30) Foreign Application Priority Data

Sep. 9, 2011    (KR) .................. 10-2011-0091930

(51) Int. Cl.
*G06F 3/0488*    (2013.01)

(52) U.S. Cl.
CPC ......... *G06F 3/04886* (2013.01); *G06F 3/0488* (2013.01)

(58) Field of Classification Search
CPC ..................... G06F 3/0488; G06F 3/04886
USPC ................... 345/168, 173; 715/773
See application file for complete search history.

(56) References Cited

U.S. PATENT DOCUMENTS

| | | |
|---|---|---|
| 2005/0097089 A1 | 5/2005 | Nielsen et al. |
| 2005/0149879 A1* | 7/2005 | Jobs et al. .................. 715/796 |
| 2006/0101354 A1* | 5/2006 | Hashimoto et al. ......... 715/863 |
| 2009/0167706 A1* | 7/2009 | Tan et al. ..................... 345/173 |
| 2009/0295750 A1 | 12/2009 | Yamazaki et al. |
| 2010/0123724 A1* | 5/2010 | Moore et al. ................. 345/473 |
| 2010/0231523 A1* | 9/2010 | Chou ............................ 345/171 |
| 2010/0241985 A1* | 9/2010 | Kim et al. .................... 715/773 |
| 2011/0122067 A1* | 5/2011 | Okabayashi ................. 345/168 |
| 2011/0202839 A1* | 8/2011 | AlKazi et al. ............... 715/703 |
| 2012/0117506 A1* | 5/2012 | Koch ................. G06F 3/04886 715/773 |
| 2013/0046544 A1* | 2/2013 | Kay et al. .................... 704/275 |

FOREIGN PATENT DOCUMENTS

| | | |
|---|---|---|
| CN | 101576783 A | 11/2009 |
| CN | 101593033 A | 12/2009 |
| KR | 20-0182613 Y1 | 3/2000 |
| KR | 10-0927183 B1 | 11/2009 |

OTHER PUBLICATIONS

Chinese Search Report, dated Jul. 29, 2016.

* cited by examiner

*Primary Examiner* — Sahlu Okebato
(74) *Attorney, Agent, or Firm* — Cha & Reiter, LLC

(57) ABSTRACT

A method for displaying different keypad configurations to allow input data using a touch screen with an appropriate keypad configuration is provided. The method comprises: displaying a plurality of identifiers respectively representing keypad configurations whose input modes are different from each other; and displaying a keypad configuration corresponding to a selected identifier when a touch event, which selects one of the displayed plurality of identifiers, is generated.

16 Claims, 12 Drawing Sheets

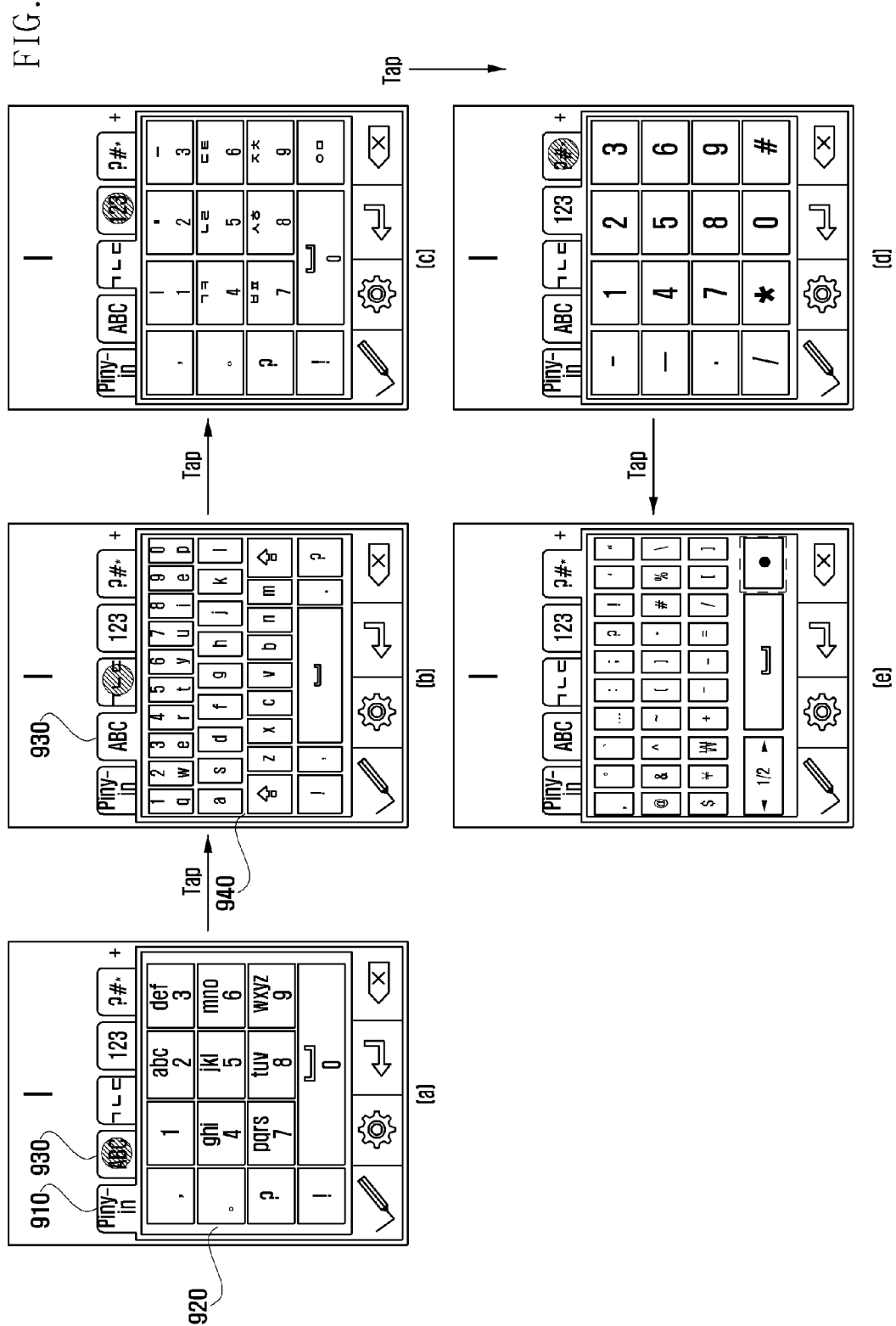

METHOD FOR PRESENTING DIFFERENT KEYPAD CONFIGURATIONS FOR DATA INPUT AND A PORTABLE DEVICE UTILIZING SAME

CLAIM OF PRIORITY

This application claims, pursuant to 35 USC 119, priority to, and the benefit of the earlier filing date of, that patent application filed in the Korean Intellectual Property Office on Sep. 9, 2011 and afforded serial number 10-2011-0091930, the contents of which are incorporated by reference, herein.

BACKGROUND OF THE INVENTION

Field of the Invention

The present invention relates to the field of keypad configuration displays and a method for displaying keypad configurations that allow appropriate inputting of data and a portable device thereof.

Description of the Related Art

With the rapid development of information communication technologies and semiconductor technologies, portable terminals have been widely distributed and used. In particular, recent portable terminals have reached a convergence phase covering other areas as well as traditional areas associated with mobile terminals (devices). Portable terminals have evolved to generally include a touch screen in which a touch event initiated by a user causes the execution and control of an application corresponding to a function indicated by the touch event.

Further, portable terminals provide various input modes such as an English QWERTY configuration, an English 3*4 key configuration, a Korean 3*4 key configuration, and special keys (e.g., hot keys). A user input may be used to change the input mode from one of a QWERTY key configuration to a Korean 3*4 key configuration, for example.

However, it is inconvenient to change the input mode in the portable terminals according to the prior art. In case a user desires to display a desired keypad (i.e., key configuration), for example, a user needs to first select a language and then select a keyboard arrangement (configuration). Therefore, a user needs to change the input mode several times when a user wishes to input various types of data.

SUMMARY OF THE INVENTION

The present invention has been made in view of the above problems, and provides a method for inputting data, which allows various types of data to be conveniently inputted by easily changing the input mode of a keypad. In addition, a portable terminal that implements the described method of changing the input mode is also disclosed.

In accordance with an aspect of the present invention, a method for inputting data using a touch screen includes: displaying a multiple of identifiers respectively representing keypads whose input modes are different from each other; and displaying a keypad corresponding to a selected identifier when a touch event, which selects one of the displayed multiple of identifiers, is generated.

In accordance with another aspect of the present invention, a portable terminal includes: a touch screen which generates a touch event in response to a user's input; a display unit which displays a multiple of identifiers respectively representing keypads whose input modes are different from each other; and a controller which controls a display presentation of a keypad corresponding to a selected identifier when a touch event, which selects one of the displayed multiple of identifiers, is received from the touch screen.

In accordance with another aspect of the present invention, a display unit including a touch screen is in communication with a processor. The processor accesses code stored in a memory, which causes the processor cause the display to display a plurality of indicators and response to a touch received from the touch screen with respect to a selected one of the indicators, display a corresponding keypad configuration in substantially a center position of the touchscreen and display the selected indicator adjacent to the displayed keypad configuration.

According to the present invention, various types of data can be conveniently inputted by easily changing the keypad configuration.

BRIEF DESCRIPTION OF THE DRAWINGS

The above features and advantages of the present invention will be more apparent from the following detailed description in conjunction with the accompanying drawings, in which:

FIGS. 8-10 illustrate a process of displaying a keypad configuration according to another exemplary embodiment of the present invention;

DETAILED DESCRIPTION OF THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

A portable terminal according to the present invention is an electronic device including a touch screen, and can be applied to all types of information communication devices and multimedia devices such as a mobile phone, a tablet PC, a handheld PC, a portable multimedia player (PMP), a personal digital assistant (PDA), a music player (e.g., an MP3 player), a portable game terminal, and a digital broadcast player, etc.

In particular, a portable terminal according to the present invention displays identifiers (Tabs), which represent a plurality of different keypads (keypad configurations) and displays a keypad (or keypad configuration) corresponding to a selected identifier. Such a feature of the present invention will be explained below in detail. However, when explaining the features of the present invention, detailed explanation of elements that are known in the art or would obscure or render the main idea of the present invention unclear are not presented.

Figure 1:
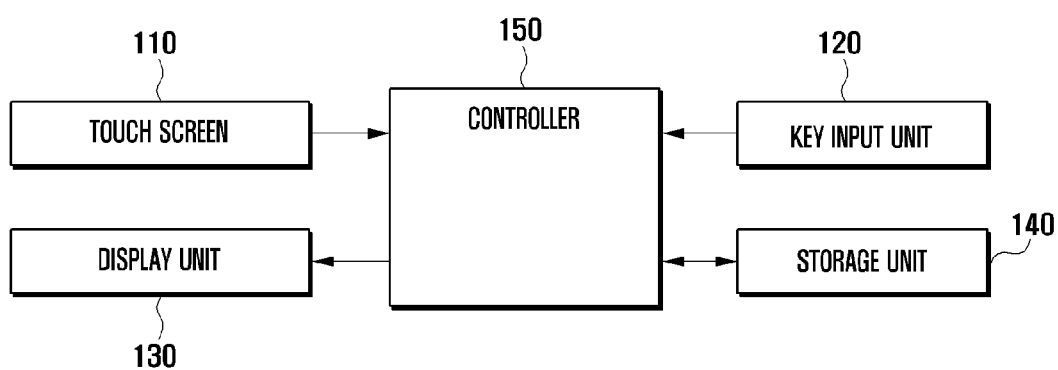
FIG. 1 illustrates a configuration of a portable terminal according to an exemplary embodiment of the present invention.

FIG. 1 illustrates a configuration of a portable terminal according to an exemplary embodiment of the present invention. Referring to FIG. 1, a portable terminal according to the present invention includes a touch screen 110, a key input unit 120, a display unit 130, a storage unit 140, and a controller 150.

The touch screen 110, which is attached on the front of the display unit 130, generates a touch event in response to a user's action on the touch screen 110, and transmits the generated touch event to the controller 150. Such an action or operation may be classified into a touch, a tap, a double tap, a press, a drag, a drag & drop, and a sweep, etc. Here, a touch is a motion of depressing one point (or a group of adjacent points) of the screen, a tap is a motion of touching one point with a finger (or a group of adjacent points) and taking the finger off the point, a double tap is a motion of consecutively tapping one point (or a group of adjacent points) twice times, a press is a motion of touching one point (or a group of adjacent points) for a period of time that is longer than the period of time of a tap and taking the finger off the point, a drag is a motion of moving a finger in a preset direction while touching one point (or a group of adjacent points as it would be appreciated that the touch screen has a resolution that is typically includes a number of touchable points within the width of a user finger or stylus or similar object that may be used to indicate a touch), a drag & drop is a motion of dragging and then taking the finger off, the touch screen and a sweep is a motion of quickly moving a finger and taking the finger off the touch screen. Here, the drag may also include a scroll motion, and the sweep is may also include a flick motion. The controller can distinguish a sweep from a drag by a movement speed. The controller 150 controls the display unit 130, etc. in response to such a touch event.

The key input unit 120 comprises a plurality of keys (not shown) for operating a portable terminal, and transmits a key signal to the controller 150. The controller 150 controls the display unit 130, etc. in response to such a key signal. The key signal can be classified into a power on/off signal, a volume adjustment signal, a screen on/off signal, an alphanumeric signal, etc.

The display unit 130 converts image data inputted from the controller 150 into signals for signal on the display unit. That is, display unit 130 displays various screens according to the use of the portable terminal. For example, the display unit can display a standby screen, a menu screen, a message writing screen, a calling screen, and an Internet screen, etc.

In one aspect of the invention, the display unit 130 can arrange the above-mentioned identifiers in a row at one side of the screen and display the identifiers. Alternatively, the display unit 130 can display a keypad corresponding to the identifier selected among the displayed identifiers. Such a display unit 130 will be explained in detail later with reference to FIGS. 5 to 12.

Further, the display unit 130 can be formed in the form of a flat display panel such as a liquid crystal display (LCD), an organic light emitted diode (OLED), and an active matrix organic light emitted diode (AMOLED), etc. Further, the display unit 130 can display a left eye image and a right eye image, and a 3D implementation unit can be included in the displayed left/right images so that user can feel the sense of depth. A three-dimensional (3D) implementation method is divided into an eyeglass method and a non-eyeglass method. The eyeglass method includes a color filter method, a polarizing filter method, and a shutter glass method, etc., and the non-eyeglass method includes a lenticular lens method, and a parallax barrier method, etc.

The storage unit 140 stores a representation of a screen to be outputted in the display unit 130 as well as the operating system of the portable terminal and applications needed for the present invention. Further, the storage unit 140 can temporarily store data that is copied in a message, a photograph, a webpage and a document, etc. by a user. Further, the storage unit 140 can broadly include a program area (not shown) and a data area (not shown). The program area can store an operating system for booting a portable terminal and operating each of the above-described keypad configurations, and application programs for supporting various user functions such as a user function for supporting a calling function, a web browser for connecting to an Internet server, an MP3 user function for replaying sound sources, an image output function for replaying photographs, etc., and a moving picture replay function, etc. In particular, the program area can recognize a handwriting, search for one or more candidate letters corresponding to the recognized handwriting from a database, and store a handwriting recognition application for displaying searched candidate letters. The data area stores data generated by the controller 150 according to the use of the portable terminal. In particular, the data area can store various keypad configurations for inputting data. Here, the keypad is classified according to the input mode of data, and can include configurations such as a QWERTY keypad, a 3*4 keypad, a special keypad, a number keypad, an English keypad, a Korean keypad, and a PINYIN keypad (a pinyin system is the official system to transcribe Chinese characters into the Roman alphabet), etc. Further, the keypad can further include a menu for controlling an application currently being executed, a clipboard for inputting temporarily stored data, an emoticon, and a template for inputting idiomatic sentences, etc.

Further, the data area can include a database for storing candidate letters corresponding to the recognized handwriting. Of course, the database can be stored in a remote server, and the portable terminal of the present invention can connect to the remote server and search for candidate letters corresponding to user's handwriting.

The controller 150 controls general operation of the portable terminal and a signal flow between internal components of the portable terminal, and perform a function of processing data. Further, the controller 150 controls a power supplied to the internal components of the terminal from a battery. In particular, the controller 150 according to the present invention can control the display unit 130 to display a window for displaying inputted data. Such a window can be displayed in the form of a full screen. Or, the window can be displayed at a portion of a screen. For example, the window can be an Internet address window, and a text message writing window, etc. Further, if a window is selected by a user, the controller 150 can control the display unit 130 to display a cursor in the window and control the cursor to flicker. The controller 150 controls the display unit 130 to display data selected in the displayed keypad in the position where the cursor is positioned. The controller 150 recognizes a trace of a drag operation, i.e., user's handwriting, searches candidate letters corresponding to the recognized handwriting from the database, and controls the display unit 130 to display the searched candidate letters. Further, the controller 150 controls the display unit 130 to display the candidate letters selected by the user among the displayed candidate letters at the position where the cursor is positioned.

Further, the controller 150 according to the present invention can control the display unit 130 to display identifiers along with the window. As explained above, such identifiers represent each of the keypad configurations, and can be arranged at one side of the screen, for example, the upper side, lower side, left side or right side in a row (column) and can be displayed. Further, the controller 150 can control the display unit to display a window first, and display the identifiers when the displayed window is selected by user. Further, the controller 150 can control display the keypad corresponding to a preset identifier and the remaining identifiers in case a window is selected by the user. For example, in case the selected window is a window for displaying inputted account numbers, the controller 150 can control the display of a number keypad first, and also display identifiers of other keypad configurations at one side of the screen.

Further, the controller 150 according to the present invention can allow the user to set identifiers to be displayed. Specifically, the controller 130 may display an identifier list in a preset order. If an identifier is selected by the user from such a list, the controller 150 can control the display to display the keypad configuration corresponding to the selected identifier. As such, user can add or change a desired identifier, which in turn allows the user to add different keypad configurations.

As explained above, the controller 150 according to the present invention provides a function that allows a user to easily select a desired keypad configuration from among a plurality of keypad configurations, which will be explained below in detail with reference to drawings.

Further, though not illustrated in FIG. 1, a portable terminal of the present invention can selectively further include components such as a mobile communication module for providing voice calling with a cellular network base station, a near field communication module for near field communication, a broadcast reception module for broadcast reception, a digital sound source replay module like an MP3 module, an Internet communication module for Internet function, etc. Such components can be modified in various ways according to the convergence trend of digital devices, and thus cannot be all listed here, but the portable terminal according to the present invention can further include other components of the same level as the above mentioned components.

Figure 2:
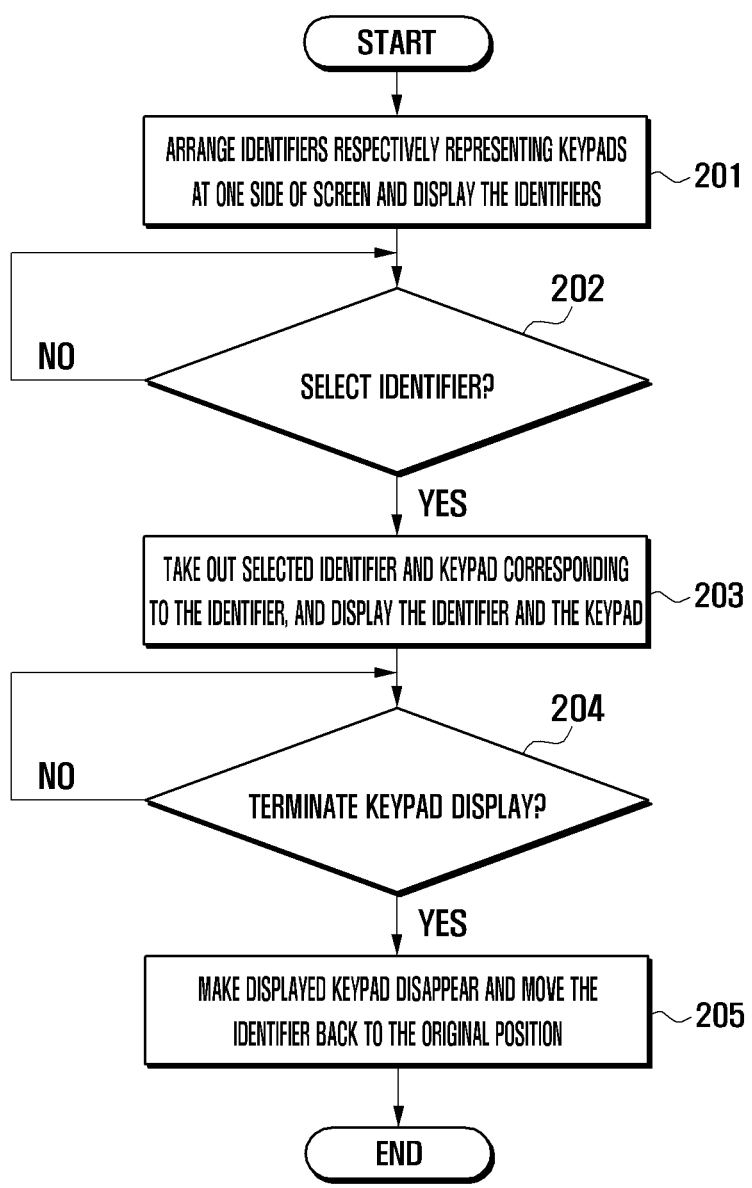
FIG. 2 is a flowchart illustrating a data input method of a portable terminal according to an exemplary embodiment of the present invention.

FIG. 2 is a flowchart illustrating a data input method of a portable terminal according to an exemplary embodiment of the present invention. Referring to FIGS. 1 and 2, first, the controller 150 can be in an idle state waiting for a user's input. In such an idle state, the controller 150 can check whether an input mode of data is executed. That is, the controller 150 can check whether an application, which requires a data input, is executed, such as a data searcher, a web browser, a message writing unit, a note unit, and a graphic editor, etc. stored in a smart phone (portable terminal). If the input mode of such data is executed, the controller 150 can control the display unit 130 to display identifiers representing each of a plurality of keypad configurations at one side of the screen in a row (201). At this time, the controller 150 can divide the display area into an upper area and the lower area, and can control the display of an application execution screen in one area or the other. In addition, the identifiers may be positioned within the area not displaying the application execution screen. Further, the controller 150 can control the display of the identifiers to be overlapped in the application execution screen. Here, the application execution screen can include a window for displaying inputted data. Further, the application execution screen can further include an area for recognizing a user's handwriting, and an area for displaying candidate letters corresponding to the recognized handwriting, etc.

Next, the controller 150 checks whether a touch event, which selects a displayed identifier, has occurred (202). Such a touch event for selecting an identifier can be generated by tapping (i.e., touching) the displayed identifier, sweeping the touched identifier to the center, or dragging & dropping the touched identifier. If the generated touch event is selects an identifier, the controller 150 controls the display to extract the selected identifier from one side of the screen and display the identifier and the corresponding keypad configuration (203). Further, the controller 150 controls the data selected from the displayed keypad configuration to be displayed in the window. If the generated touch event fails to correspond to an identifier, the controller 150 can perform a function corresponding to the generated touch event. For example, the controller 150 can perform a function of setting an identifier to be displayed. Such a function will be explained with reference to FIG. 4.

Next, the controller 150 checks whether a touch event for terminating the display of a keypad configuration is generated (204). Such a touch event for terminating the display can be generated by a motion of a touch within an area that is not associated with the displayed keypad configuration. Further, such a touch event can also be generated by a motion of sweeping the keypad configuration to one side of the screen or dragging & dropping the keypad configuration. For example, the keypad may be dragged and dropped within a designated area that removes the keypad from the screen. Alternatively, the keypad configuration may be dragged to an edge of the touch screen and dropped. The edge of the touch screen may represent an area that signifies a removal area.

If the generated touch event terminates the displayed keypad configuration, the controller 150 controls the display unit 130 to remove the keypad from the display (205). Further, the controller 150 moves the corresponding identifier to one side of the screen. If the generated touch event is does not terminate the displayed keypad configuration, the controller 150 can perform a corresponding function. For example, the controller 150 can perform a function of moving the keypad in the movement direction of the touch.

Figure 3:
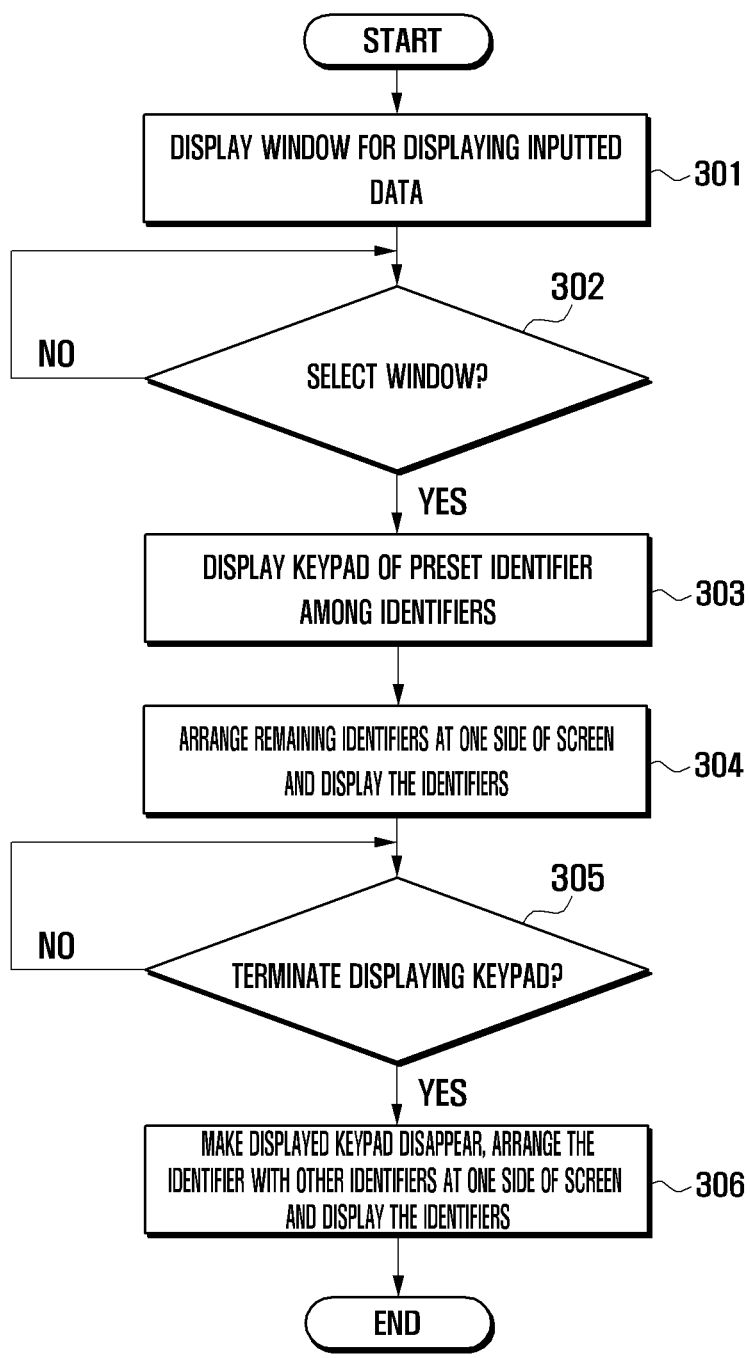
FIG. 3 is a flowchart illustrating a data input method of a portable terminal according to another exemplary embodiment of the present invention.

FIG. 3 is a flowchart illustrating a data input method of a portable terminal according to another exemplary embodiment of the present invention. Referring to FIGS. 1 and 3, the controller 150 may be in the state of displaying a window (301). Such a window can be a window allocated at a portion of the screen, such as a message writing window, an Internet address window, a data search window, an ID input window, etc.

Next, the window 150 checks whether a touch event, which selects a window, has been generated (302). Such a touch event for selecting a window can be generated by a motion of tapping a window. Further, such a touch event can also be generated by tapping a certain soft key allocated in advance for selecting a window. If a generated touch event selects a window, the controller 150 controls the display unit to display a corresponding keypad of a preset identifier among the displayed identifiers (303). Further, the controller 150 displays the other (remaining) identifiers at one side of the screen in a row or a column (304). Here, the keypad, configuration, which is directly indicated, when selecting a window, can be set by the user in advance. Further, such a keypad configuration can also be set according to the window type. For example, if the window is an Internet address window, a 3*4 keypad configuration can be displayed, and if the window is a message writing window, a QWERTY keypad con configuration can be displayed. Further, if a generated touch event is not setting a window, the controller 150 can perform a function corresponding to the generated touch event.

Next, the controller 150 checks whether a touch event of terminating the display of a keypad configuration has been generated (305). Such a touch event for terminating the display can be generated by a motion of tapping the identifier of the keypad configuration located on the side of the keypad configuration (see FIGS. 6(b) and (c), for example). In another aspect of the invention, such a touch event can be generated by a motion of sweeping the identifier of the keypad configuration to one side of the screen (i.e., a dragging & dropping operation that drags the identifier "off" the screen). In another aspect of the invention, such a touch event can also be generated by a motion of tapping another identifier.

When a generated touch event for terminating the display is detected, the controller 150 controls the display unit 130 to make the currently displayed keypad configuration disappear (i.e., removed from the display) (306). Further, the controller 150 moves the identifier of the disappeared (removed) keypad to one side of the screen where other identifiers are positioned.

When the generated touch event for terminating the keypad configuration is not detected, controller 150 can perform a corresponding function of the generated touch event.

Figure 4:
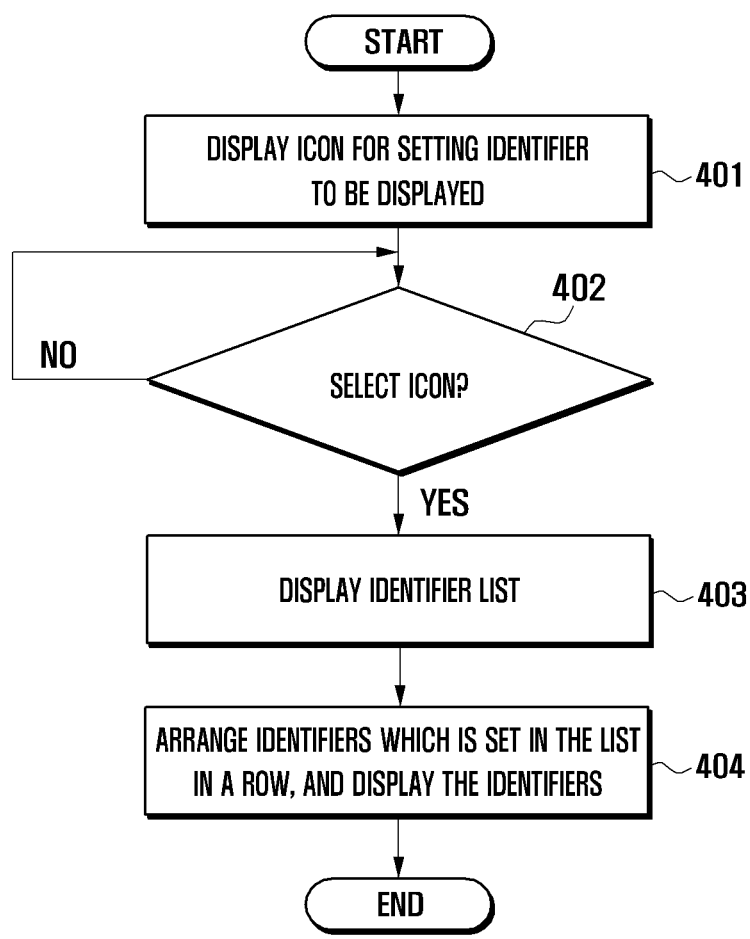
FIG. 4 is a flowchart illustrating a method of setting an identifier of a portable terminal according to an exemplary embodiment of the present invention.

FIG. 4 is a flowchart illustrating a method of setting an identifier of a portable terminal according to an exemplary embodiment of the present invention. Referring to FIGS. 1 to 4, the controller 150 can control the display of an icon for adding or changing an identifier to be displayed along with identifiers associated with keypad configurations (401). Such an icon can be arranged along with the identifiers associated with the keypad configurations in a row (or a column along a side of the screen).

The controller 150 checks whether a touch event, which selects the icon, has been generated (402). Such a touch event can be generated by a motion of tapping the icon. If the generated touch event is associated with selecting an icon, the controller 150 controls the display unit 130 to display a list of identifiers associated with the keypad configurations (i.e., identifier list) (403). Further, the controller 150 controls the display unit 130 to arrange the identifiers selected from the list in a row (or column) (404).

If the generated touch event is not associated with selecting an icon, the controller 150 can perform a corresponding function of the generated touch event.

Hereinafter, the present invention will be explained in more detail through a screen example.

Figure 5:
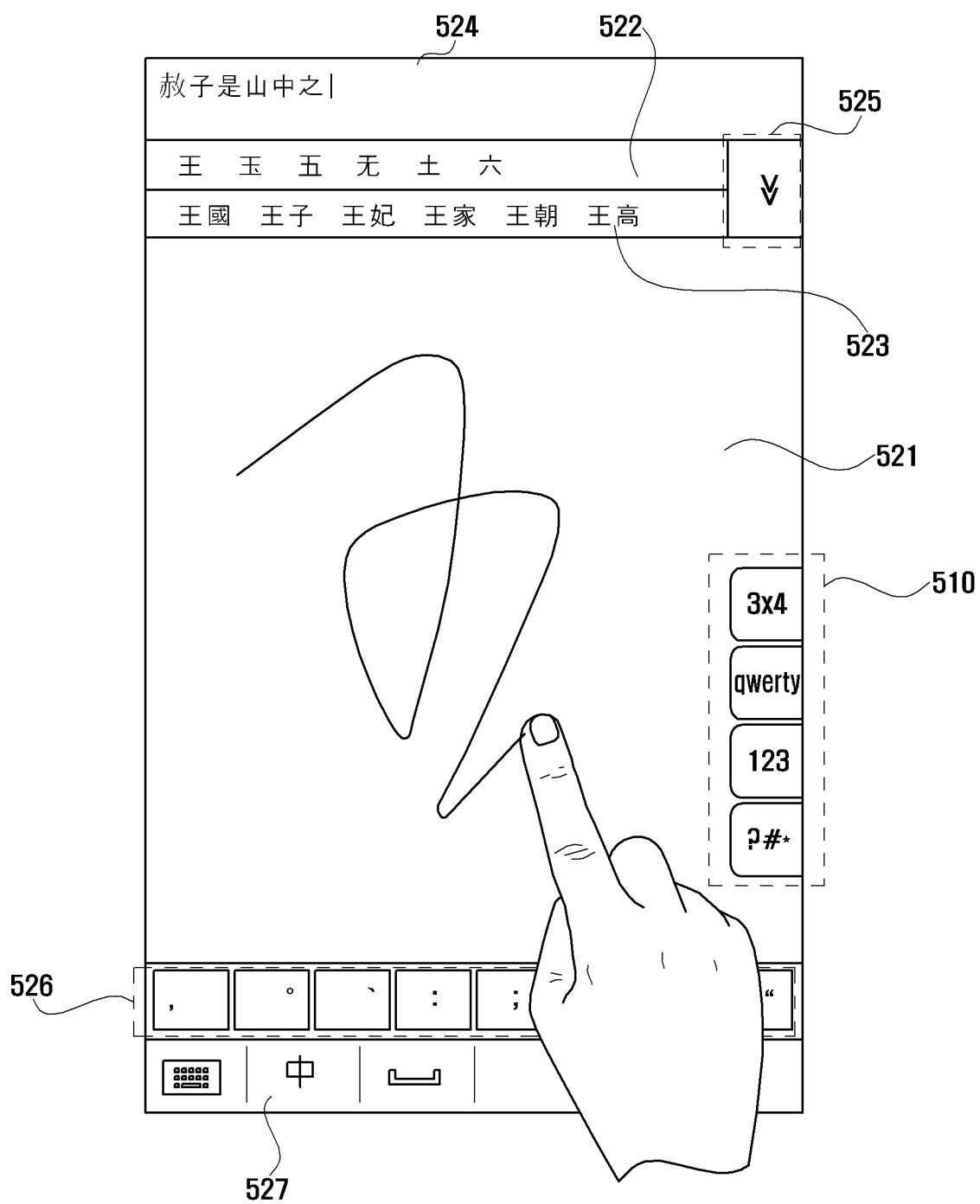
FIG. 5 illustrates a process of displaying an identifier according to an exemplary embodiment of the present invention.

FIG. 5 illustrates a process of displaying an identifier according to an exemplary embodiment of the present invention. Referring to FIG. 5, if the input mode of data is executed, the display unit 130 can display a screen including identifiers associated with keypad configurations 510 according to the control of the controller 150. Here, the display unit 130 can overlap the identifiers 510 in the application execution screen, and display the identifiers 510. The application execution screen 520 is an execution screen of a handwriting recognition application, and can include a handwriting recognition area 521 for recognizing user's handwriting, a candidate letter area 522 for indicating candidate letters corresponding to the recognized handwriting, an associated word area 523 for indicating words associated with the selected candidate letters, an window area 524 for indicating selected candidate letters, associated words, and data inputted through the keypad, an icon 525 for additionally indicating candidate letters and associated words, a recent input data area 526 for indicating recently inputted data, and a menu area 527 for controlling an application, etc. The identifiers 510 have been illustrated to be arranged on the right side of the screen in FIG. 5, but it is possible for the identifiers 510 may be arranged on the upper side, the lower side or the left side of the screen without altering the scope of the invention claimed.

Figure 6:
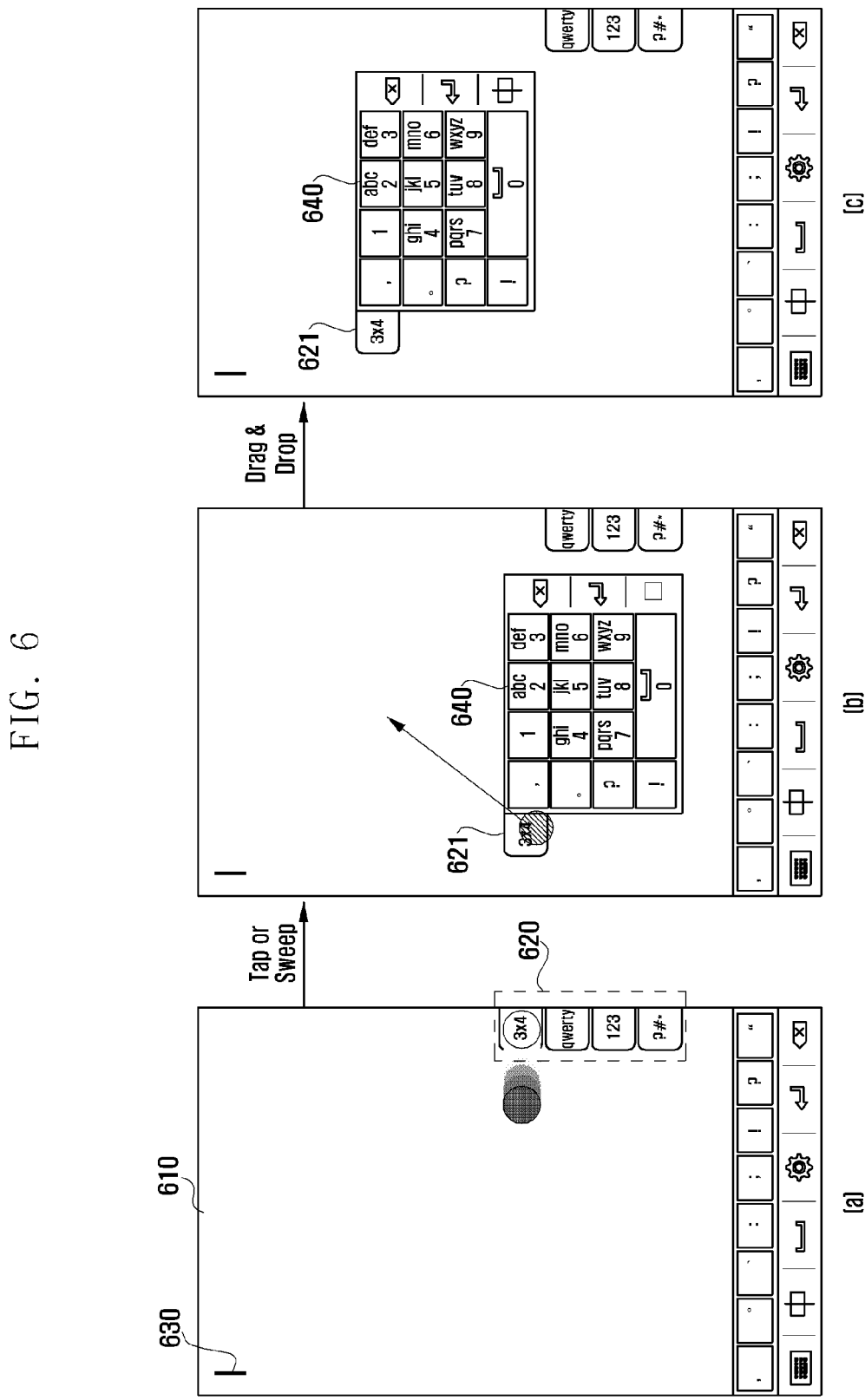
FIG. 6 illustrates a process of displaying a keypad according to an exemplary embodiment of the present invention.

FIG. 6 illustrates a process of displaying a keypad according to an exemplary embodiment of the present invention.

Referring to FIG. 6, the display unit 130 can provide a window 610 in the form of a full screen according to the control of the controller 150. Further, the display unit 130 can overlap the identifiers associated with the keypad configurations 620 in the window 610 and display the identifiers 620. Further, the display unit 130 can first display the window 610 according to the control of the controller 150. Thereafter, if the window 610 is selected by the user, the controller 150 can control the display unit 130 to display a cursor 630 and display identifiers 620. While a screen as shown in FIG. 6(a) is displayed, if any one of the identifiers 620 is selected by the user, the display unit 130 removes out the selected identifier 621 from the list of displayed indicators (i.e., displayed along the right side of the screen) and displays the identifier 621 adjacent the associated keypad configuration, which is displayed in the center of the screen according to the control of the controller 150 as illustrated in FIG. 6(b). Further, the display unit 130 overlaps the keypad 640 in the window 610, and displays the overlapped keypad 640. If such a keypad 640 is operated by the user, the touch screen 110 transmits a touch event related with the operation to the controller 150. Further, the controller 150 controls the display unit 130 to display data according to user's operation in a position where a cursor 630 has been positioned. Further, if the identifier 621 is dragged by the user, the controller 150 moves the identifier 621 and the corresponding keypad 640 in the dragged direction as illustrated in FIG. 6(c).

Figure 7:
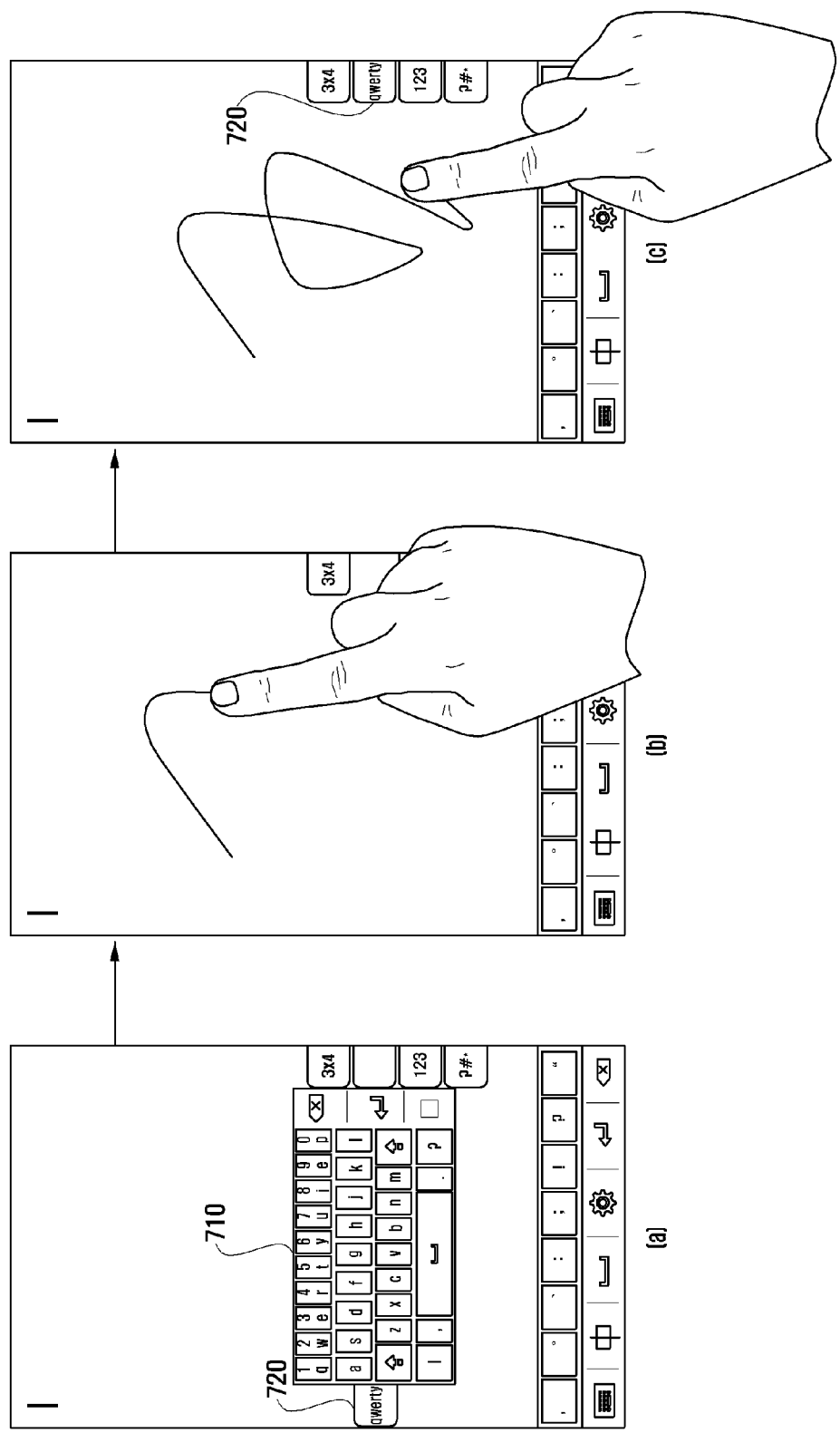
FIG. 7 illustrates a process of terminating the display of a keypad configuration according to an exemplary embodiment of the present invention.

FIG. 7 illustrates a process of terminating the display of a keypad according to an exemplary embodiment of the present invention. FIG. 7(a) illustrates a QWERTY keypad configuration centered in the screen. An identifier 720 associated with the displayed QWERTY keypad is located on a left side of the QWERTY keypad. In addition, identifies for keypad configurations of 3×4, blank, 123 and ?#* are displayed along the right side of the screen.

In the state where a keypad configuration 710 is displayed as illustrated in FIG. 7(a), if the user touches an area which is not associated with the keypad 710 as illustrated in FIG. 7(b), the controller 150 controls the display unit 130 to make the keypad 710 disappear. Alternatively, the termination of the display can be done by tapping the corresponding identifier 720.

Further, as illustrated in FIG. 7(*c*), the controller 150 can control the display unit 130 to arrange the identifier 720 of the display-terminated keypad 710 with other identifiers on the right of the screen in a row (column) to display the identifiers associate with all the keypad configurations. In this case, the QWERTY identifier replaces the blank identifier that was included on the list and the QWERTY identifier takes its original place within the list of identifiers associated with the keypad configurations.

Figure 8A:
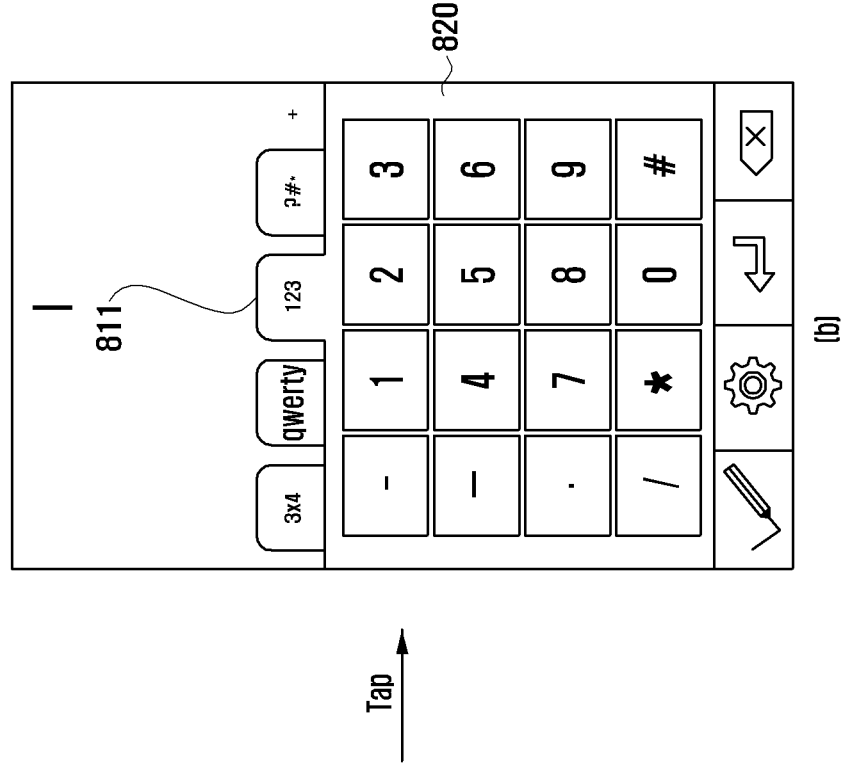
Figure 8B:
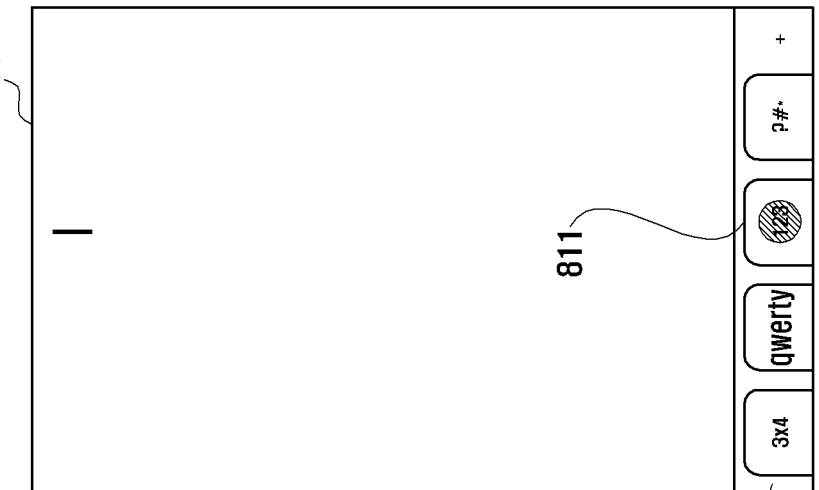
Figure 10:
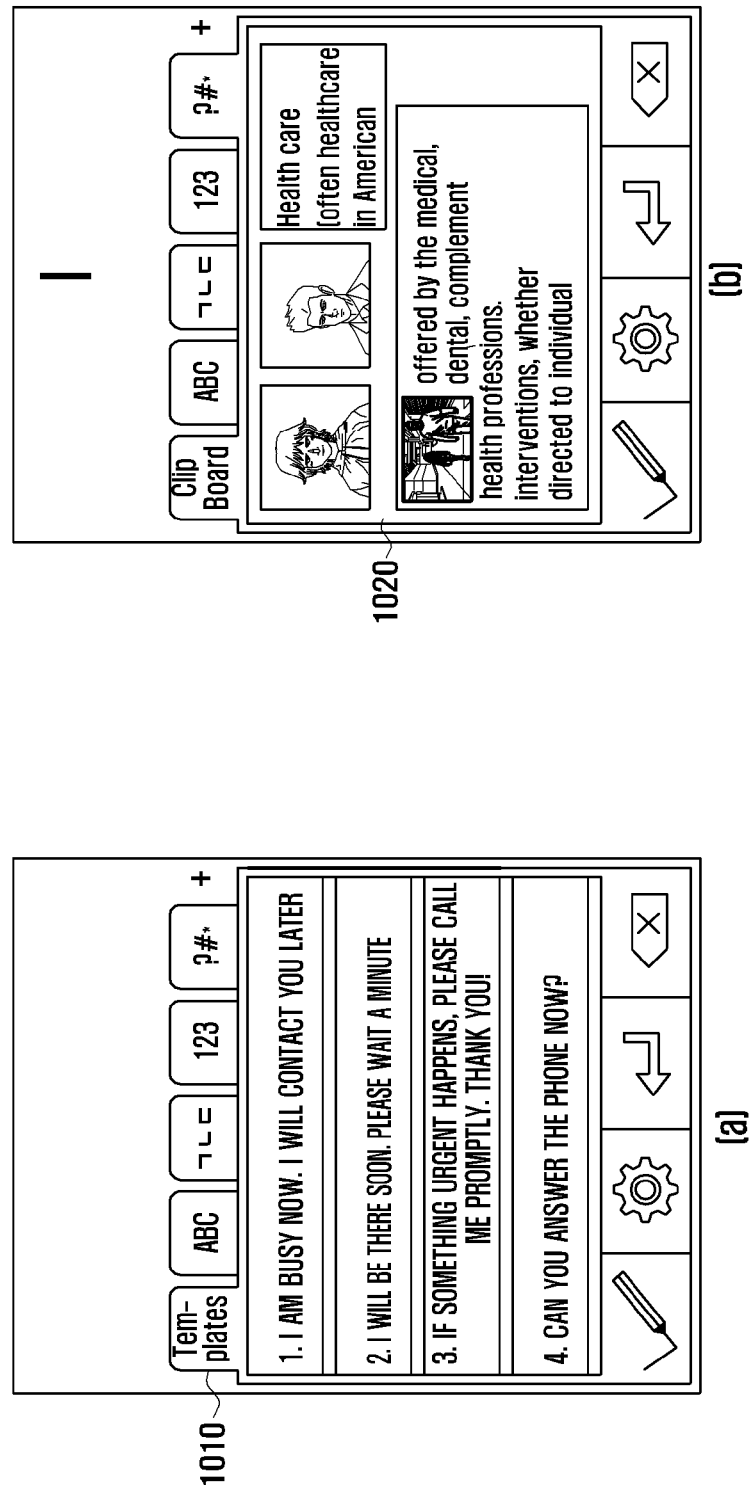

FIGS. 8-10 illustrate a process of displaying a keypad according to another exemplary embodiment of the present invention.

Referring to FIG. 8, as illustrated in FIG. 8(*a*), the display unit 130 can display identifiers on the lower side of the screen according to the control of the controller 150. If any one of the identifiers 811 is selected among identifiers 810 in such a state (e.g., 123), the controller 150 controls the display unit 130 to display the identifiers 810 on the upper side of the screen, as illustrated in FIG. 8(*b*). Further, the controller 150 can control the display unit 130 to display the corresponding keypad 820 of the selected identifier 810 beneath the identifier 810.

Referring to FIGS. 9(*a*) and 9(*b*), in the state where the PINYIN keypad 920 of the selected identifier 910 is displayed, if an English QWERTY identifier 930 (as represented by the characters ABC) is selected by the user, the controller 150 controls the display unit 130 to display an English QWERTY keypad 940 instead of the PINYIN keypad 920. Further, referring to FIGS. 9(*c*) and 9(*d*), other keypads can also be displayed by the same method. For example, in FIG. 9(*c*), the selection of a Korean 3×4 keypad configuration allows for the conversion of Korean characters into algebraic numerical characters. FIG. 9(*d*) illustrates the selection of a keypad configuration in which a numeric character keypad configuration is displayed. FIG. 9(*e*) illustrates the case when a special character identifier (?#*) is selected and special character keypad configuration is displayed.|

Referring to FIGS. 10(*a*) and (*b*), the keypad can include a template 1010 for inputting idiomatically often used sentences, and a clipboard 1020 for inputting data such as a temporarily stored image, a text and a map, etc. Further, though not illustrated, the keypad may include a menu for controlling emoticons and an application currently being executed. That is, in FIG. 10(*a*) an identifier may represent "Templates" which allow for the inputting of well-known or often used or user inputted words or phrases. FIG. 10(*b*) illustrates an identifier "Clipboard," which allows the user to input information stored in a clipboard file. The information in the clipboard file may have been extracted from another page or message.

Figure 11:
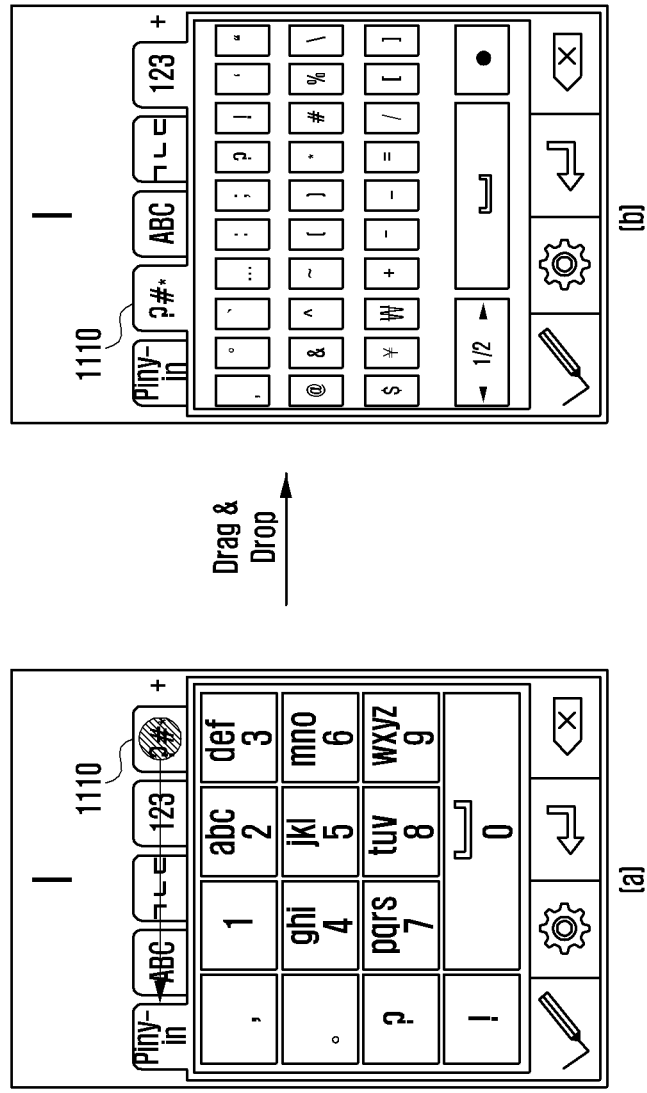
FIG. 11 illustrates a process of changing an arrangement of identifiers according to an exemplary embodiment of the present invention.

FIG. 11 illustrates a process of changing an arrangement of an identifier within the identification list according to an exemplary embodiment of the present invention. As illustrated in FIG. 11(*a*), the display unit 130 arranges a plurality of identifiers on a straight line (row or column), and displays the arranged identifiers. In such a state, if one identifier 1110 is dragged and dropped along the straight line, the controller 150 can move the identifier 1110 to the dropped position as illustrated in FIG. 11(*b*). In this exemplary example, the identifier associated with a special character keypad configuration is dragged from the last place to the second place on the list of identifiers.

Figure 12:
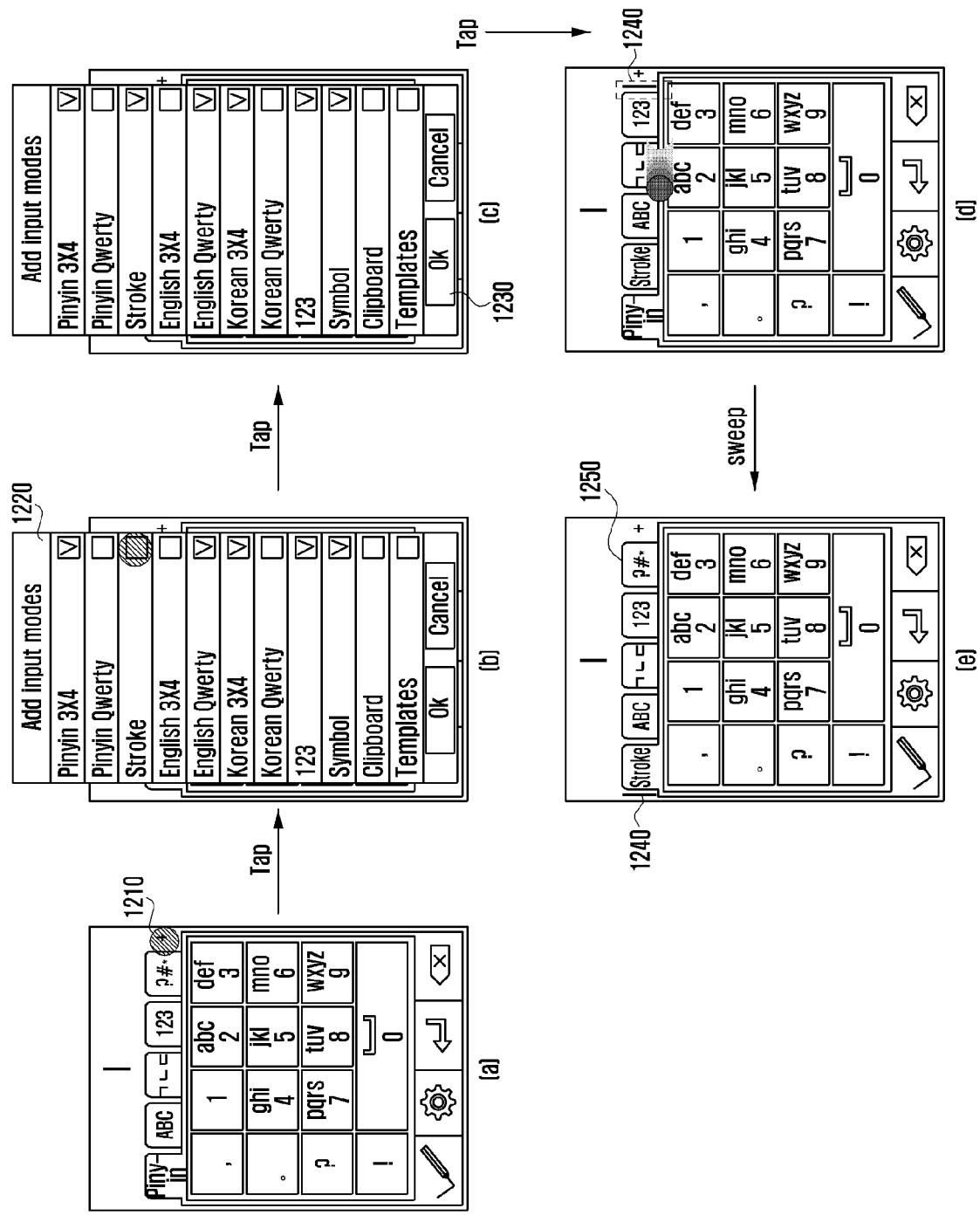
FIG. 12 illustrates a process of setting an identifier to be displayed according to an exemplary embodiment of the present invention.

FIG. 12 illustrates a process of setting an identifier to be displayed according to an exemplary embodiment of the present invention. Referring to FIG. 12, the display unit 130 arranges an icon 1210 for setting an identifier to be displayed along with identifiers currently being displayed in a row, as illustrated in FIG. 12(*a*). In such a state, if the icon 1210 for setting the identifier is selected by the user, the controller 150 can control the display unit 130 to display an identifier list 1220 in the form of a pop-up as illustrated in FIG. 12(*b*). The existing selected identifiers can be displayed in the "checked" state in the identifier list 1220. A user can set the display unit to display preferred keypads through such an identifier list 1220. In this illustrated example, the user can select the identifier associated with "stroke" as indicated by the hashed circle.

As illustrated in FIG. 12(*c*), if the user taps a setting completion icon (OK) 1230 after completing the setting of the identifier, the touch screen 110 transmits the related touch event to the controller 150. As such, the controller 150 controls the display to display the identifiers that are set.

Further, referring to FIG. 12(*d*), in case all set identifiers are not visible on the display (i.e., 6 identifiers are selected in FIG. 12(*c*) but only 5 identifiers are visible on the display unit), the controller 150 displays a portion of the identifiers that are not visible.

Further, the controller 150 controls the display to display an indicator (or icon) 124, which allows user to recognize that not all of the indicators are visible. That is, as illustrated in FIG. 12(*d*), the display unit 130 displays a portion of identifiers, and displays the indicator 1240 on the right side which substitutes for the not visible identifiers. In such a state, for example, if the user sweeps the indicator 1240 to the left, the display unit 130 displays the identifier 1250, which is hidden according to the control of the controller 150 as illustrated in FIG. 12(*e*). Further, the display unit 130 hides the identifier (icon) on the left, and displays the indicator 1240 instead at the last position.

The data input method according to the present invention may be implemented in an executable program command form by various computer means and be recorded in a computer readable recording medium. In this case, the computer readable recording medium may include a program command, a data file, and a data structure individually or a combination thereof. In the meantime, the program command recorded in a recording medium may be specially designed or configured for the present invention or be known to a person having ordinary skill in a computer software field to be used.

The computer readable recording medium includes tangible Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program command includes a machine language code created by a complier and a high-level language code executable by a computer using an interpreter. The foregoing hardware device may be configured to be operated as at least one software module to perform an operation of the present invention.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method comprising:
in response to an operation of an application being executed, outputting, by an electronic device, a menu comprising a plurality of identifiers, each identifier corresponding to a respective configuration of a keypad, wherein the menu is output while the keypad is hidden;
displaying the keypad in a first configuration in response to a first selection of a first identifier from the menu, the keypad including a plurality of keys; and
inputting a character, or portion thereof, into a graphical user interface (GUI) of the application, in response to a second selection of one of the plurality of keys; and
if a move touch event for selection of one identifier of the plurality of identifiers is detected, extracting the selected identifier from the menu and displaying contiguously both the selected identifier and the corresponding configuration of the keypad with the selected identifier being positioned at a released location of the move touch event and extending from the corresponding keypad configuration as a tab,
wherein when the keypad is hidden none of the keypad's configurations are displayed.

2. The method of claim 1, wherein the keypad's configurations include a numerical configuration, a first language configuration, and a second language configuration.

3. The method of claim 1, wherein:
the menu is displayed at a first location in a display screen of the electronic device; and
displaying the keypad comprises removing the first identifier from the menu and displaying the first identifier at a second location in the display screen.

4. The method of claim 3, further comprising returning the first identifier to the menu in response to an input for hiding the keypad.

5. The method of claim 1, further comprising: in response to detecting a handwriting input to a display screen of the electronic device, displaying a window including: (i) a first area identifying a plurality of candidate letters corresponding to the handwriting; and (ii) a second area identifying a plurality of words corresponding to a letter from the first area that is selected.

6. The method of claim 5, further comprising: in response to a third selection of the window while the keypad is displayed, removing the keypad from display.

7. The method of claim 3, further comprising relocating the keypad in response to the first identifier being selected while the keypad is displayed in the first configuration.

8. The method of claim 1, further comprising hiding the keypad in response to an input received outside of the keypad.

9. An electronic device comprising a display screen and a controller, the controller being configured to:
in response to an application being executed, output a menu comprising a plurality of identifiers, each identifier corresponding to a respective configuration of a keypad, wherein the menu is output while the keypad is hidden;
display the keypad in a first configuration in response to a first selection of a first identifier from the menu, the keypad including a plurality of keys;
input a character, or portion thereof, into a graphical user interface (GUI) the application, in response to a second selection of one of the plurality of keys; and
if a move touch event for selection of one identifier of the plurality of identifiers is detected, the selected identifier is extracted from the menu and both the selected identifier and the corresponding configuration of the keypad are contiguously displayed with the selected identifier being positioned at a released location of the move touch event and extending from the corresponding keypad configuration as a tab,
wherein when the keypad is hidden none of the keypad's configurations are displayed.

10. The electronic device of claim 9, wherein the keypad's configurations include a numerical configuration, a first language configuration, and a second language configuration.

11. The electronic device of claim 9, wherein:
the menu is displayed at a first location in the display screen; and
wherein the controller removes the first identifier from the menu and displaying the identifier t a second location in the display screen.

12. The electronic device of claim 11, wherein the controller is further configured to return the first identifier to the menu in response to an input for hiding the keypad.

13. The electronic device of claim 9, wherein the controller is further configured to, in response to detecting a handwriting input to the display screen, display a window including: (i) a first area identifying a plurality of candidate letters corresponding to the handwriting; and (ii) a second area identifying a plurality of words corresponding to a letter from the first area that is selected.

14. The electronic device of claim 13, wherein the controller is further configured to hide the keypad in response to the first identifier being selected while the keypad is displayed in the first configuration.

15. The method of claim 1, wherein the character includes an emoticon.

16. The electronic device of claim 9, wherein the character includes an emoticon.

* * * * *